(12) United States Patent
Bockman

(10) Patent No.: US 6,542,247 B2
(45) Date of Patent: Apr. 1, 2003

(54) MULTI-AXIS INTERFEROMETER WITH INTEGRATED OPTICAL STRUCTURE AND METHOD FOR MANUFACTURING RHOMBOID ASSEMBLIES

(75) Inventor: John J. Bockman, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/876,531

(22) Filed: Jun. 6, 2001

(65) Prior Publication Data

US 2002/0191191 A1 Dec. 19, 2002

(51) Int. Cl.[7] ................................................. G01B 9/02
(52) U.S. Cl. ........................ 356/493; 356/492; 356/487
(58) Field of Search ................................ 356/492, 493, 356/487

(56) References Cited

U.S. PATENT DOCUMENTS 4,784,490 A  * 11/1988  Wayne ........................ 356/487
4,802,765 A  *  2/1989  Young et al. ................ 356/487

* cited by examiner

Primary Examiner—Constantine Hannaher

(57) ABSTRACT

A manufacturing method for rhomboid assemblies cuts stacks of glass plates that are glued together with coatings between the glass plates. The cuts are at an angle such as 45° and surfaces resulting from the cuts are finished to optical tolerances. These optical surfaces permit attachment of rhomboid assemblies directly to optical elements such as a polarizing beam-splitter (PBS) in a multi-axis interferometer. Further, elements such as quarter-wave plates, cube corner reflectors, and rhomboid elements that extend the separation of measurement beams can be attached to the PBS to provide integrated beam optics that are compact and thermally stable. Placing a reflective coating or other reference reflector on a quarter-wave plate for the reference beam can keep the entire beam path for the reference beam within the integrated structure. When rhomboid elements extend the separation between measurement beams, an extension to the PBS can match the optical path lengths of reference and measurement beams.

36 Claims, 8 Drawing Sheets

MULTI-AXIS INTERFEROMETER WITH INTEGRATED OPTICAL STRUCTURE AND METHOD FOR MANUFACTURING RHOMBOID ASSEMBLIES

BACKGROUND

Multi-axis interferometers generally divide a laser beam into several separate input beams, one for each axis of the interferometer. The separation between the input beams depends on the geometry of the interferometer and must provide measurement beams with sufficient separation for a determination of the pitch and yaw of the object or objects being measured. Generally, for accurate measurements of an object, the measurement beams must be parallel to each other to within a small angular tolerance that is often less than a few arcseconds.

Shearplate beam-splitters can generate separate input beams in interferometers. A shearplate beam-splitter is basically a plate of glass having two parallel surfaces. A light beam enters the shearplate beam-splitter at a first surface and is partially transmitted at a second surface. The transmitted portion of the beam forms a first input beam. The internally reflected portion subsequently reflects off the internal surfaces of the shearplate beam-splitter one or more times before exiting at the second face to form a second input beam. The two input beams remain parallel because the surfaces of the shearplate beam-splitter can be made parallel and flat to a high degree of accuracy.

A disadvantage of shearplate beam-splitters is that achieving larger separations between beams generally requires thicker and longer plates of glass. Accordingly, the shearplate beam-splitters can be too large for some applications.

A rhomboid/prism assembly is another optical system that can split a beam into two separated parallel beams. A rhomboid/prism assembly generally includes a rhomboid element and a prism attached to the rhomboid element. With one input scheme, a beam entering perpendicular to a first face of the prism is partially reflected at the interface between the prism and the rhomboid element. The reflected portion exits the prism and forms a first beam. The transmitted portion travels the length of the rhomboid element, reflects from a surface of the rhomboid element that is parallel to the interface with the prism, and exits the rhomboid element as a second beam, which is parallel to the first beam. The length, not the thickness, of a rhomboid element determines the separation between the beams. Accordingly, rhomboid/prism assemblies do not have to increase in thickness to increase beam separation and therefore do not have the size problem associated with shearplate beam-splitters.

A disadvantage of rhomboid/prism assemblies is that manufacture of these assemblies from individual rhomboid and prism components requires the individual components to be fabricated with a very high degree of accuracy, and the process that glues the prism to the rhomboid element must be similarly accurate. These difficulties, particularly the requirement of accurate angles between the faces of the rhomboid and prism elements, make manufacture of rhomboid/prism assemblies problematic when the exiting beams must be parallel to within a few arcseconds.

For an interferometer, a shearplate beam-splitter and/or a rhomboid/prism assembly can be mounted with a polarizing beam-splitter (PBS), a reference mirror or mirrors, and other optical elements on a rigid base. The base that holds the separate components such as the PBS and reference mirrors in alignment must be made of a physically and thermally stable material to ensure stable interferometer measurements.

A disadvantage of mounting the critical components separately in this fashion is the measurement instability that still arises from thermal expansion of the mounting structure even though the mounting structure is made of a stable material.

SUMMARY

In accordance with an aspect of the invention, the manufacture of a rhomboid assembly starts with parallel plates of glass typically having optical coatings on one or more surface. The parallel plates are glued together before the cutting, grinding, and polishing that forms additional optical surfaces of the rhomboid assembly. The component elements of the rhomboid assembly are automatically matched to each other and not subject to the difficulties encountered when attaching separate preformed components because optical surfaces of the components are formed after the elements are rigidly attached. The rhomboid assembly thus manufactured solves the size problem associated with shearplate beam-splitters and can be extended to provide three or more separate beams. Additionally, the manufacturing method allows batch manufacture of multiple separate rhomboid assemblies from the same parallel plates.

One specific method in accordance with the invention manufactures a rhomboid assembly by forming a coating on a surface a first plate of glass, gluing the first plate to a second plate of glass with the coating between the first and second plate, making parallel cuts through the first and second plate of glass at an acute angle, and finishing some or all of the resulting parallel surfaces to optical tolerances. Before making the parallel cuts, one or more additional plate of glass can be glued with additional coatings between adjacent pair of plates. The parallel cuts cut through all the glued plates, and the resulting rhomboid assembly contains as many elements as there were plates glued together. Cutting and finishing an end of an assembly can convert one of the rhomboid elements into a prism.

In accordance with another aspect of the invention, an integrated beam handling optical structure can include one or more rhomboid assemblies and other optical elements that are optically attached into an integrated whole. Attaching the separate elements provides a compact and lightweight configuration with thermal stability that maintains the relative orientations of the surfaces of the optical elements. Accordingly, a compact interferometer with the integrated beam handling optics can provide measurement stability and a large number of measurement axes.

One specific embodiment increases measurement stability by placing a highly reflective (HR) coating directly on a quarter-wave plate or other element that is optically attached to a polarizing beam-splitter (PBS). The HR coating forms a reference mirror that has a stable position and orientation relative to the PBS. This eliminates possible relative motion between a PBS and reference mirrors and eliminates the need for a separate reference mirror.

A specific embodiment of the invention is an interferometer including: a PBS oriented to split an input beam into a reference beam and a measurement beam; a polarization-changing element such as a quarter-wave plate that is optically attached to a surface of the PBS and in a path of the reference beam; and a reflective coating on the polarization-changing element. The reflective coating reflects the reference beam back through the polarization-changing element and back into the PBS. Other elements such as a retroflector can be optically attached to the PBS so that the entire path of the reference beam up to output with the measurement beam is inside the integrated beam optics structure.

Another embodiment of the invention is an interferometer that includes a PBS and a first rhomboid assembly optically attached to the PBS. The first rhomboid assembly receives a first beam and splits the first beam into multiple input beams directed into the PBS. The interferometer can further include a second rhomboid assembly optically attached to the PBS. The second rhomboid assembly receives a second beam and splits the second beam into a multiple beams. One of the beams from the second rhomboid assembly is the first beam input to the first rhomboid assembly. Generally, the beams from the first rhomboid assembly are separated from each other along a first axis, and the beams from the second rhomboid assembly are separated from each other along a second axis that is perpendicular to the first axis.

The interferometer can still further include one or more optical elements optically attached to the PBS and the second rhomboid assembly. Each of these optical elements receives one of the other beams from the second rhomboid assembly and directs one or more beams toward the PBS. Each of these optical elements can be for example a rhomboid element or a further rhomboid assembly.

Still another embodiment of the invention is an interferometer including: a PBS oriented to split an input beam into a reference beam and a measurement beam; and a rhomboid element optically attached to the PBS and positioned to receive the measurement beam from the PBS. The rhomboid element shifts the position of the measurement beam to correspond to the position of a measurement reflector and can provide a separation between measurement beams that is greater than the PBS could otherwise accommodate. Generally, the interferometer also includes an extension to the PBS for the path of the reference beam, the extension having a length such that an optical path length of the reference beam through the extension matches an optical path length of the measurement beam. An extension can also or alternatively be provided when to match the optical path length of a reference beam to the optical path length of a measurement beam that traverses glass in the measurement reflector. These extensions can be part of the PBS or separate elements optically attached to the PBS.

BRIEF DESCRIPTION OF THE DRAWINGS

Use of the same reference symbols in different figures indicates similar or identical items.

DETAILED DESCRIPTION

In accordance with an aspect of the invention, a manufacturing process for a rhomboid assembly produces the rhomboid assembly without separately manufacturing rhomboid or prism elements or gluing the separate rhomboid or prism elements together. Instead, parallel plates of glass having appropriate coatings are glued together and then cut, ground, and polished to form the several rhomboid assemblies. For each assembly, the cutting, grinding, and polishing precisely aligns the assembly elements and provides a plane surface that can be cemented or optically contacted to another optical element such as a PBS in an integrated beam handling structure of an interferometer. The integrated beam handling structure can further encompass the entire optical path for one or more reference beams of the interferometer. In particular, the integrated structure can include elements such as quarter-wave plates and reference reflectors that have stable configurations relative to a PBS to which the elements are attached as part of an integrated whole. The rhomboid assemblies and the integrated structures provide compact beam optics for creation of a compact interferometer having a large number of measurement axes.

FIGS. 1A to 1D illustrate a manufacturing process using two plates of optical glass to form rhomboid assemblies.

Figure 1A:
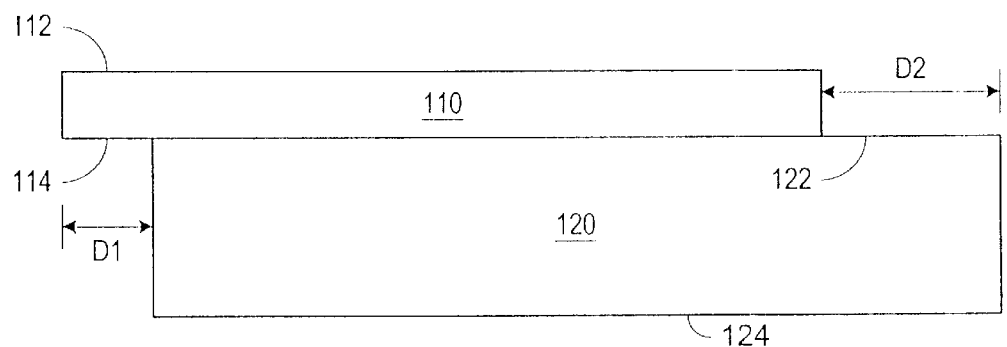
FIGS. 1A, 1B, and 1C illustrate structures formed during a manufacturing process forming rhomboid assemblies from two parallel plates of glass.

FIG. 1A shows two parallel glass plates 110 and 120 that are glued to each other for the formation of rhomboid assemblies. Glass plates 110 and 120 have major optical surfaces 112, 114, 122, and 124 that are parallel and planar. The thicknesses of plates 110 and 120 depend on the desired dimensions of the rhomboid assemblies being produced and particularly depend on the desired separation between parallel exit beams. Glass plates 110 and 120 are preferably made of the same material but can be any type of optical grade glass. Glass plates made of BK7 or fused silica, for example, are suitable and can be made sufficiently homogeneous to provide the desired optical properties of the rhomboid assemblies being manufactured.

One of glass plates 110 and 120 has a beam-splitter coating on a major surface 114 or 122 that is at the glue layer between plates 110 and 120. In a preferred embodiment, the beam-splitter coating is on a major surface (e.g., surface 114 of glass plate 110) that an incident beam encounters before traversing the glue layer between plates 110 and 120.

The beam-splitter coating has characteristics that depend on the desired performance and behavior of the rhomboid assemblies being manufactured. In particular, the transmittance and reflectance of the beam-splitter coating at the relevant incidence angle and wavelength in the rhomboid assembly depend on the desired ratio of the power of the transmitted and reflected beams. In extreme cases, the beam-splitter coating can be made highly reflective to reflect nearly 100% of an incident beam or nearly transparent to transmit most of the incident beam. To produce a rhomboid assembly for use in the input optics of an interferometer that separates an input beam into reference and measurement beams having orthogonal polarizations, transmittance and reflectance should be nearly independent of the polarization of the incident beam. The design of an appropriate beam-splitter coating depends critically on the wavelength of the light being used and the desired ratio of the transmitted power to the reflected power. Typically, such coatings include multiple layers of two or three different materials with different indices of refraction. Design techniques for such coatings are known in the art, and conventional beam-splitter coatings can be employed. These coatings can also be obtained commercially from a number of sources including Dominar, Inc. of Santa Clara, Calif.

An index matching optical cement such as type M-62 from Summers Optical for BK7 glass is suitable for attaching glass plates 110 and 120. The thickness of the resulting glue layer is typically about 10 μm, but the thickness is not critical, except that the gluing process should keep the surfaces of plates 110 and 120 parallel to each other to avoid creating a glue layer having a wedge angle that disturbs how precisely parallel the exit beams are. One embodiment of the invention employs an interferometer in precisely controlling the orientations of plates 110 and 112 during the gluing and/or curing process.

As shown in FIG. 1A, the gluing process leaves attached plates 110 and 120 with plate 110 extending a distance D1 beyond the edge of plate 120 at one end and plate 120 extending a distance D2 beyond the edge of plate 110 at the opposite end. Distances D1 and D2 reduce the amount of waste material from a subsequent cutting process. Distances D1 and D2 generally depend on the thickness of respective plates 110 and 120 and the cutting angle.

Figure 1B:
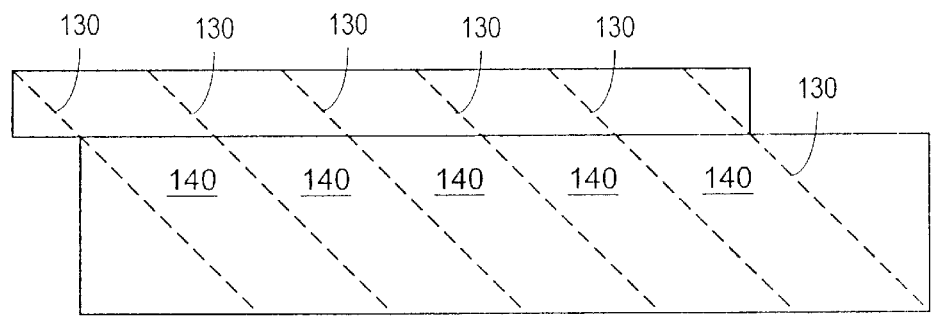

FIG. 1B illustrates parallel planar cuts 130 made at an acute angle (typically 45°) to the major surfaces 112, 114, 122, and 124 of plates 110 and 120 to produce several blanks 140, each blank 140 having a cross-section that is a parallelogram. A diamond saw or other conventional equipment for manufacture of optical elements can make parallel cuts 130. For each blank 140, at least one surface and typically both surfaces resulting from cuts 130 are finished (e.g., ground and polished) to optical tolerance. Conventional grinding and continuous polishing, for example, using a spindle polisher or other conventional equipment can perform the necessary finishing and does not significantly damage glue layers between elements. The newly polished surfaces of each assembly 140 are preferably parallel to each other, but the precision with which the polished surfaces are parallel is generally not critical.

Figure 1C:
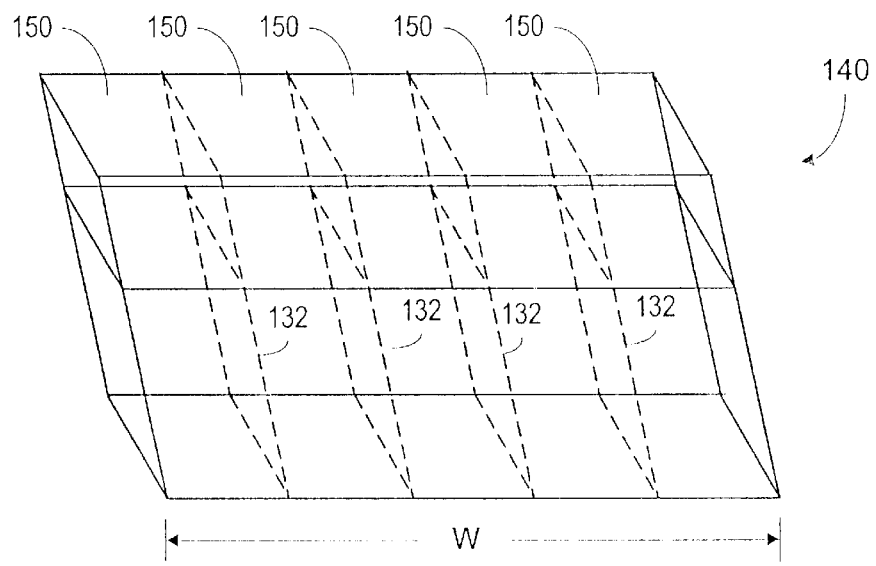

As shown in FIG. 1C, each blank 140 has a width W equal to the width of the original glass plates 110 and 120. When blank 140 is sufficiently wide, parallel cuts 132 can separate each blank 140 into several separate rhomboid assemblies 150. The surfaces resulting from cuts 132 are generally not optical surfaces of rhomboid assemblies 150 and therefore do not require grinding or polishing. The width of each rhomboid assembly 150 (i.e., the separations between cuts 132) can be adjusted according to factors such as the required structural strength or rigidity of the assembly, the diameter of light beams passing through the assembly, and the separation of beams when the rhomboid assembly is designed to accommodate multiple input beams.

Antireflective (AR) coatings are generally required at air-glass beam interfaces to reduce the energy lost by reflections. Accordingly, the input and output apertures of a rhomboid assembly often requires an AR coating. Forming an AR coating after forming the rhomboid assembly presents difficulties because fabrication of environmentally robust AR coatings normally requires high temperature processes that could degrade the quality of the embedded glue layers in the rhomboid assembly. In accordance with an aspect of this invention, an optical element having an AR coating can be cemented onto the rhomboid assembly where an input beam enters the rhomboid assembly or an output beam exits the rhomboid assembly. Cementing the optical element to a rhomboid assembly provides an AR coating and avoids the need to subject the rhomboid assembly to the high temperatures.

Figure 1D:
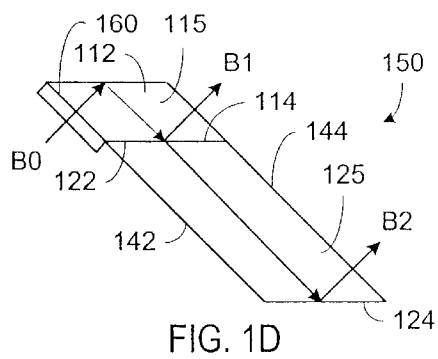
FIGS. 1D and 1E show alternative beam paths for a rhomboid assembly including two rhomboid elements.
Figure 1E:
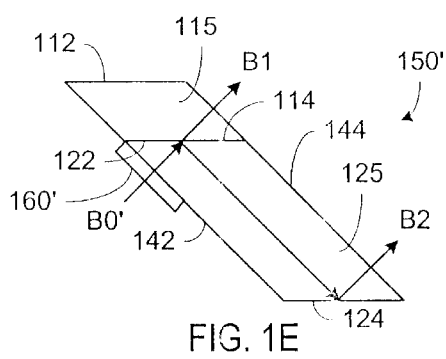

FIGS. 1D and 1E illustrate alternate beam paths through a rhomboid assembly 150 that includes two attached rhomboid elements 115 and 125 that were cut from plates 110 and 120. The beam path of FIG. 1D provides two parallel exit beams B1 and B2 from an original beam B0. Original beam B0 is incident perpendicular to a surface 142 of rhomboid assembly 150, and an optical element 160 with an AR coating is on surface 142 to reduce optical power loss from beam B0 that reflection from surface 142 could cause. Optical element 160 can be an optical window, a prism that redirects beam B0 to the direction normal to surface 142, or any element having an AR coating on the air-glass interface of beam B0. Optical element 160, which provides the AR coating, is not required when rhomboid assembly 150 is attached to an assembly that provides the input beam or when output beams from rhomboid assembly 150 pass directly into glass as described further below.

For the beam path of FIG. 1D, beam B0 undergoes a total internal reflection at surface 112 in rhomboid element 115. With cuts 130 at an angle of 45° with surface 112, the internally reflected beam is directed parallel to surfaces 142 and 144 and strikes the beam-splitter coating between rhomboid elements 115 and 125 at 45° to the normal. The beam-splitter coating reflects a portion of internal beam to provide exit beam B1. Beam B1 exits normal to surface 144 or rhomboid element 115. An internal beam transmitted through the beam splitter coating undergoes total internal reflection at surface 114 of rhomboid element 125 to generate exit beam B2, which exits normal to surface 144. The properties of the beam-splitter coating determine the ratio of the intensities of exit beams B1 and B2.

In this embodiment of the invention, rhomboid elements 115 and 125 have cross sections that are parallelograms with 45° and 135° internal angles, and the original thickness of plate 110 is the separation between incident beam B0 and exit beam B1 divided by $\sqrt{2}$. The original thickness of plate 120 is the separation of exit beams B1 and B2 divided by $\sqrt{2}$.

For the beam path of FIG. 1E, an original beam B0' is incident perpendicular to surface 142 of rhomboid assembly 150' and incident on the beam-splitter coating between elements 115 and 125. An optical element 160' having an AR coating is optically attached at the input aperture of rhomboid assembly 150'. The portion of original beam B0' transmitted through the beam-splitter coating forms exit beam B1, which is collinear with the beam leaving optical element 160'. The beam reflected from the first beam-splitter coating travels parallel to surface 142 until undergoing total internal reflection at surface 124 to form exit beam B2.

For both beam paths, the precision with which beams B1 and B2 are parallel primarily depends on the precision with which surfaces 114 and 124 are parallel. The manufacturing process of the current invention can provide highly parallel beams B1 and B2 because plates 110 and 120 can be made parallel to a high precision and the gluing process for plates 110 and 120 can be accurately controlled. In contrast, a process that forms rhomboid elements 115 and 125 before gluing is subject to errors and differences in angles in the separate rhomboid elements and gluing errors resulting in a wedge angle for the glue layer. In particular, gluing is more difficult to accurately control when gluing the separate and relatively small rhomboid elements.

Having cuts 130 at 45° with major surfaces of plates 110 and 120 and having a beam at normal incidence to surface 142 avoid the complication of refraction of the input beam at surface 142 and exit beams B1 and B2 at surface 144. However, other angles for the internal angles of the rhomboid elements or the incident beams can also provide parallel exit beams.

Figure 1F:
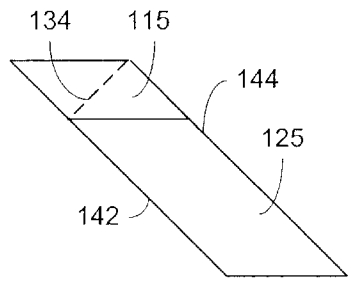
FIG. 1F illustrates a further cut for formation of a rhomboid assembly including a rhomboid element and a prism.

As an alternative to a rhomboid assembly including just rhomboid elements, the manufacturing processes in accordance with the invention can also produce rhomboid assemblies including prism elements. To produce a prism element in a rhomboid assembly, a cut 134 can be made perpendicular to surfaces 142 and 144, at an end of an assembly 150 as shown in FIG. 1F. Cut 134 converts rhomboid element 115 into a prism 117. Generally, cut 134 and finishing of the newly formed surface can be performed before cuts 132 (FIG. 1C).

Figure 1G:
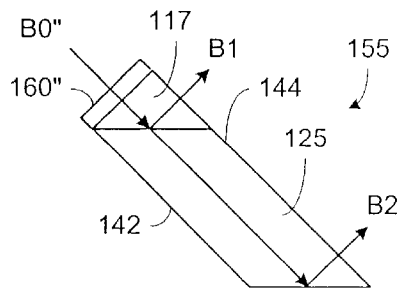
FIGS. 1G and 1H show alternate beam paths for the rhomboid assembly including a rhomboid element and a prism element.
Figure 1H:
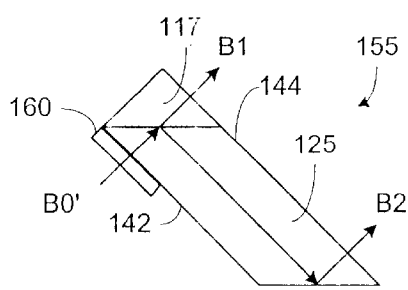

In place of incident beam B0, which is perpendicular to surface 142 of rhomboid assembly 150, the resulting rhomboid/prism assembly 155 as shown in FIG. 1G can receive an original beam B0" directed parallel to surface 142 of rhomboid assembly 155. Accordingly, the surface resulting from cut 134 is ground and polished to create and optical surface, and an optical element 160" having an AR coating can be attached to surface 134 to reduce energy loss from incident beam B0" due to reflection at an air-glass interface. Alternatively, rhomboid/prism assembly 155 can receive the original beam B0', which is perpendicular to surface 142 and directly incident on the beam-splitter coating.

Figure 2A:
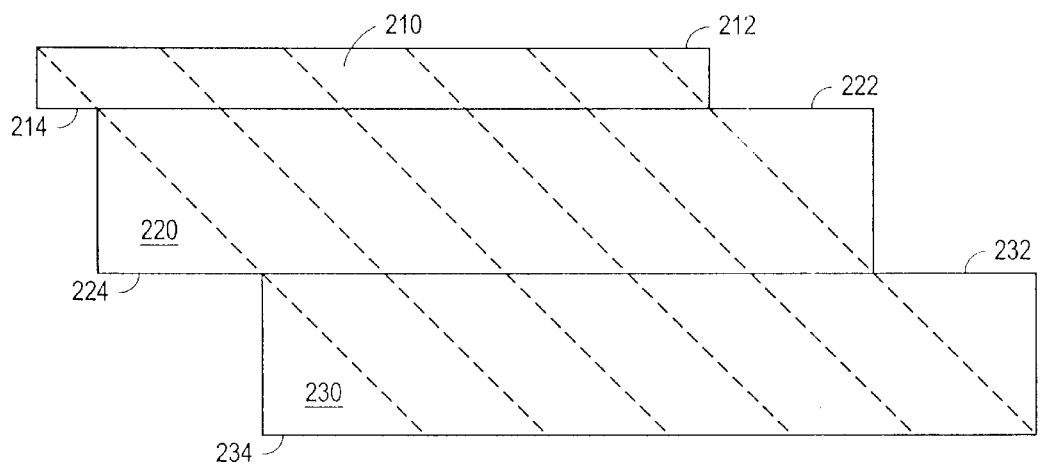
FIG. 2A illustrates cuts made during a manufacturing process forming rhomboid assemblies from three parallel plates of glass.

The manufacturing method described above can be expanded to combine three or more parallel plane plates and provide three or more exit beams at any desired separations along an axis. FIG. 2A illustrates a manufacturing process in which three parallel glass plates 210, 220, and 230 are glued together with beam-splitter coatings at the two interfaces of the three plates (e.g., on surface 214 of plate 210 and surface 224 of plate 220). The gluing process is easiest to control by first gluing two of plates 210, 220, and 230 together, and gluing the remaining plate after glue between the other two plates has sufficiently cured. The materials in plates 210, 220, and 230, the beam-splitter coatings, and the glue layers that bind plates 210, 220, and 230 together are similar or identical to those described above in regard to FIGS. 1A to 1F.

Figure 2B:
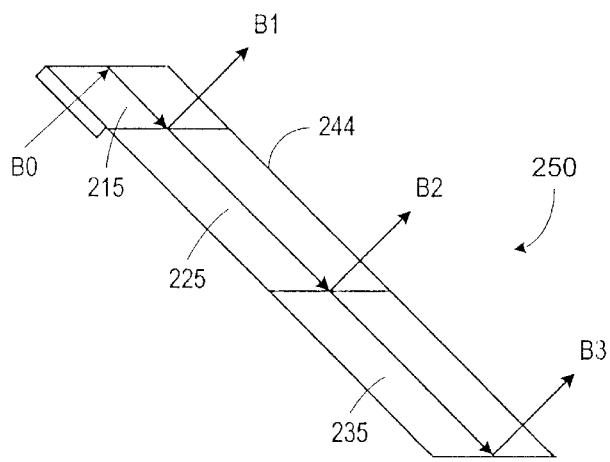
FIG. 2B shows a side view and a beam path for a rhomboid assembly including three rhomboid elements.

Glued plates 210, 220, and 230 are cut, ground, and polished in a manner similar to that illustrated in FIGS. 1B and 1C to form rhomboid assemblies such as the rhomboid assembly 250 including three rhomboid elements 215, 225, and 235 as illustrated in FIG. 2B. FIG. 2B also illustrates a beam path for generation of three exit beams B1, B2, and B3 from original beam B0. An alternative beam path (not shown) results if original beam B0 is shifted to a direct incident on the beam-splitter coating between rhomboid elements 215 and 225.

Figure 2C:
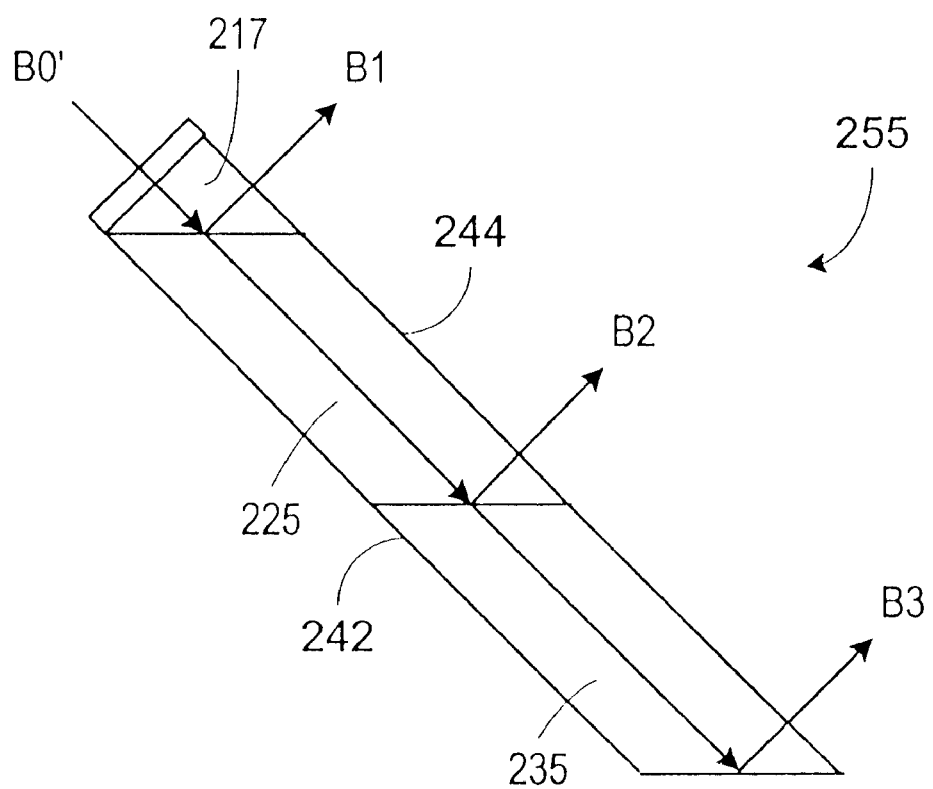
FIG. 2C shows a side view and a beam path for a rhomboid assembly including two rhomboid elements and a prism element.

A rhomboid assembly 255 of FIG. 2C includes a prism element 217 and can be produced by cutting rhomboid element 215 in a manner similar to the cutting of rhomboid element 115 described above in regard to FIG. 1F. With prism element 217, rhomboid assembly 255 can generate exit beams B1, B2, and B3 from an original beam B0' directed along the length of rhomboid assembly 250.

The relative intensities of exit beams B1, B2, and B3 depend on the properties of the beam-splitter coatings. For example, to generate three beams B1, B2, and B3 of equal intensity from original beam B0 or B0' of FIG. 2B or 2C, the beam-splitter coating at the interface between rhomboid elements 225 and 215 or 217 reflects one third of the incident intensity and transmits two thirds of the incident intensity, and the beam-splitter coating at the interface between rhomboid elements 225 and 235 has equal reflectance and transmittance.

Rhomboid assemblies 150, 155, 250, and 255 have optical output surfaces 144 and 244 that are planar and not subject to steps, breaks, or other discontinuities that are often present at the interfaces between adjacent rhomboid or prism elements that were glued together using traditional manufacturing methods. With the traditional manufacturing method, a step or break in the output surface can result because the two angles in adjacent rhomboid or prism elements do not exactly add up to 180° and/or because of a relative twist or translation between the elements during gluing. Having no step or break in the plane of the output face allows the rhomboid/prism assembly to be optically contacted or cemented with index matching optical cement directly to the input face of a PBS of an interferometer. This eliminates the air/glass interface where refraction can degrade the beam parallelism, and antireflection (AR) coatings are not needed on the rhomboid/prism assembly output face or the input face of the PBS when the two are optically contacted or cemented.

Figure 3A:
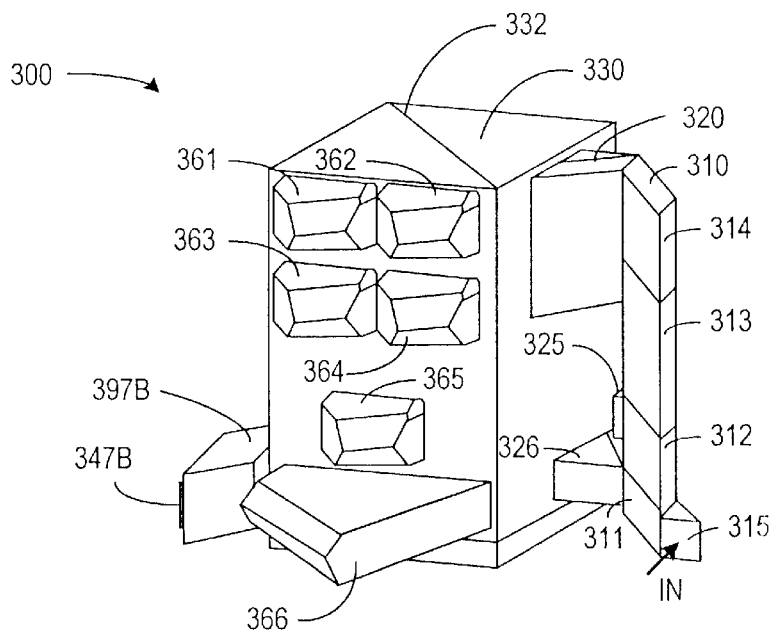
FIGS. 3A and 3B are respectively isometric and front views of a 7-axis interferometer in accordance with an embodiment of the invention.
Figure 3B:
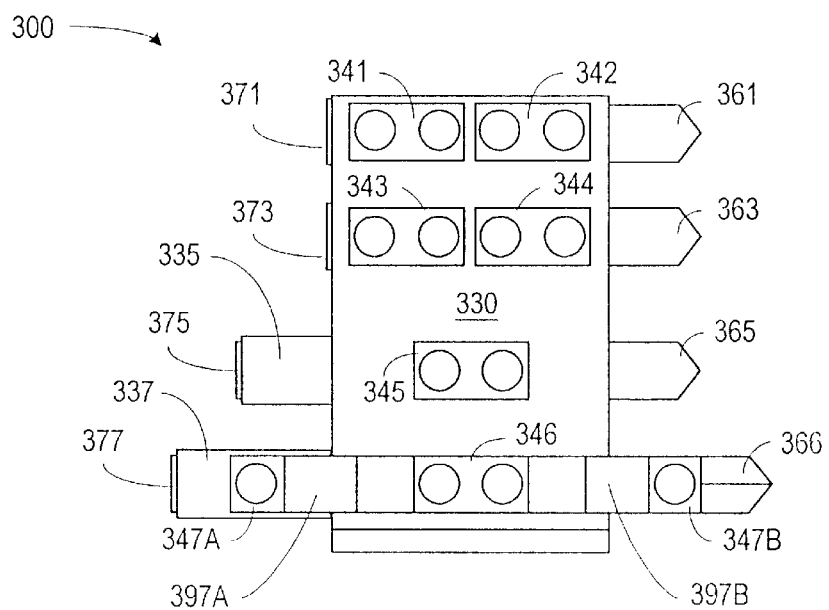

FIGS. 3A and 3B are perspective and front views of a 7-axis interferometer 300 including integrated beam optics with rhomboid assemblies 310, 320, and 326 optically attached to a PBS 330. More particularly, rhomboid assembly 310 is directly attached to input surfaces of rhomboid assemblies 320 and 326. Rhomboid assemblies 320 and 326 are directly attached to PBS 330.

In addition to rhomboid assemblies 310 and 320 being attached to PBS 330, the integrated optics of 7-axis interferometer 300 includes: extensions 335 and 337 of PBS 330, quarter-wave plates 341, 342, 343, 344, 345, 346, 347A, and 347B; cube corner reflectors 361, 362, 363, 364, 365, and 366; quarter-wave plates 371, 372, 373, 374, 375, 376, and 377; and rhomboid elements 397A and 397B directly or indirectly attached to PBS 330. Reference reflectors are implemented as highly reflective (HR) coatings 381, 382, 383, 384, 385, 386, and 387 on respective quarter-wave plates 371, 372, 373, 374, 375, 376, and 377.

The separate elements of 7-axis interferometer 300 can be optically attached to each other through an optical contact where optically smooth surfaces of separate elements molecularly bond to each other without the need of optical cement. Alternatively, an index matching optical cement can optically attach some or all of the elements. Optically attaching all of these elements provides a compact integrated beam optics structure that does not require separate mountings for the various elements. In addition to being compact, the beam optics are highly stable because thermal expansion or warping of a mounting plate does not change the relative orientations of the elements.

The functions of the optical elements in an integrated structure such as that of interferometer 300 are described further in reference to FIGS. 3A and 3B and FIGS. 4A, 4B, 4C, and 4D. FIGS. 4A, 4B, 4C, and 4D show beam paths and structural configurations with measurement beams and the input beams having orientations that differ from the orientations of measurement beams and input beams from the structure of FIGS. 3A and 3B. In particular, FIGS. 3A and 3B show a configuration in which measurement beams initially pass through PBS coating 332 and emerge from a side of PBS 330 opposite the surface through which input beams enter PBS 330. In contrast, FIGS. 4A, 4B, 4C, and 4D show configurations in which measurement beams initially reflect from PBS coating 332 and emerge from a side of PBS 330 adjacent the surface through which input beams enter PBS 330.

As shown in FIG. 3A, rhomboid assembly 310 includes four rhomboid elements 311, 312, 313, and 314 that serve to split input beam IN into four parallel beams. An optical element 315, which is attached at the input aperture of rhomboid assembly 310, is prism that has an AR coating for reduction of energy loss by reflection of input beam IN. Prism 315 is oriented according to the position of the source of input beam IN, which in FIG. 3A, happens to be to one side of PBS 330. Alternatively, the orientation of prism 315 can be changed or an optical window can replace prism 315 for a beam source having a different location.

In the orientation of FIG. 3A, rhomboid assembly 310 receives input beam IN and creates vertical separations between four beams used in distinct horizontal planes of interferometer 300.

In rhomboid assembly 310, total internal reflection from a bottom surface of rhomboid element directs the input beam toward a first beam splitter coating, which is between rhomboid elements 311 and 312. Reflection from the first beam-splitter coating generates a beam that is the input to rhomboid assembly 326 and is in a plane of two of the seven measurement axes of interferometer 300. The beam transmitted through the first beam-splitter coating of rhomboid assembly 310 has the remaining power of input beam IN and is incident on a second beam-splitter coating, which is between rhomboid elements 312 and 313.

The second beam-splitter coating reflects part of the incident energy, and the reflected light from the second beam-splitter coating forms an input beam directed directly into PBS 330. An optical element 325 having an AR coating is attached to rhomboid assembly 310 where the beam exits. A back surface of PBS 330 has an AR coating in the area of the air-glass interface of the beam reflected from the second beam splitter coating of rhomboid assembly 310. (The AR coating on PBS 330 is only in selected areas to avoid the areas where elements such as rhomboid assemblies 320 and 326 optically contact PBS 330.) A block of glass having the same thickness as rhomboid assemblies 320 and 326 can fill the gap between rhomboid assembly 310 and PBS 330 to eliminate the air-glass interfaces.

A third beam-splitter coating, which is between rhomboid elements 313 and 314 receives light transmitted through the second beam-splitter coating and reflects part of the incident energy. The reflected light from the third beam-splitter coating forms a first input beam to rhomboid assembly 320. The first input beam of rhomboid assembly 320 is for another plane containing two of the seven measurement axes of interferometer 300. The light transmitted through the third beam-splitter coating undergoes total internal reflection at the end of rhomboid assembly 310 and forms a second input beam to rhomboid assembly 320. The second input beam of rhomboid assembly 320 is for a plane containing two more of the seven measurement axes of interferometer 300.

Figure 4A:
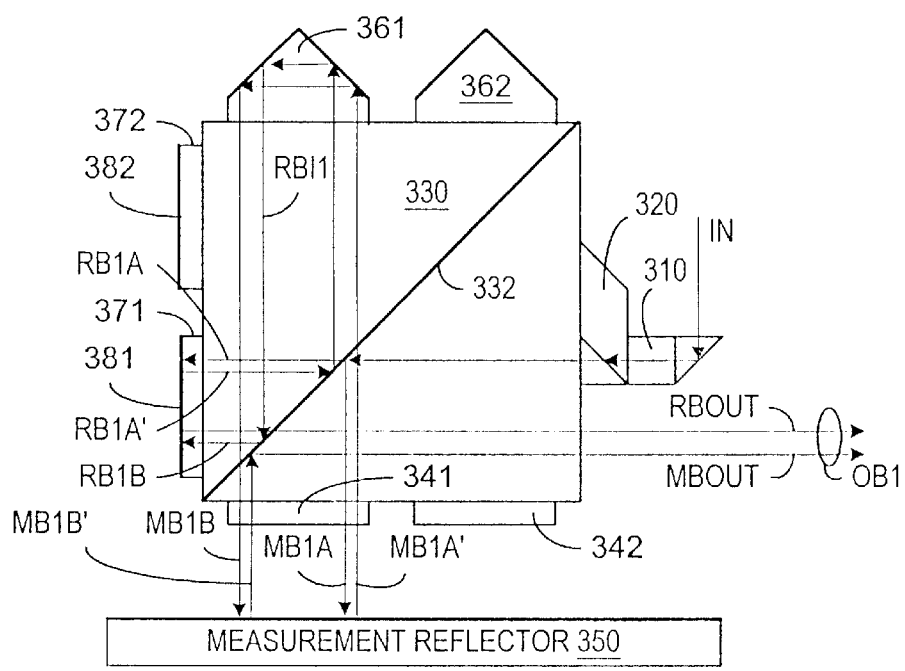
FIGS. 4A, 4B, 4C, and 4D show selected beam paths in selected horizontal cross-sections of an interferometer similar to the 7-axis interferometer of FIGS. 3A and 3B.
Figure 4B:
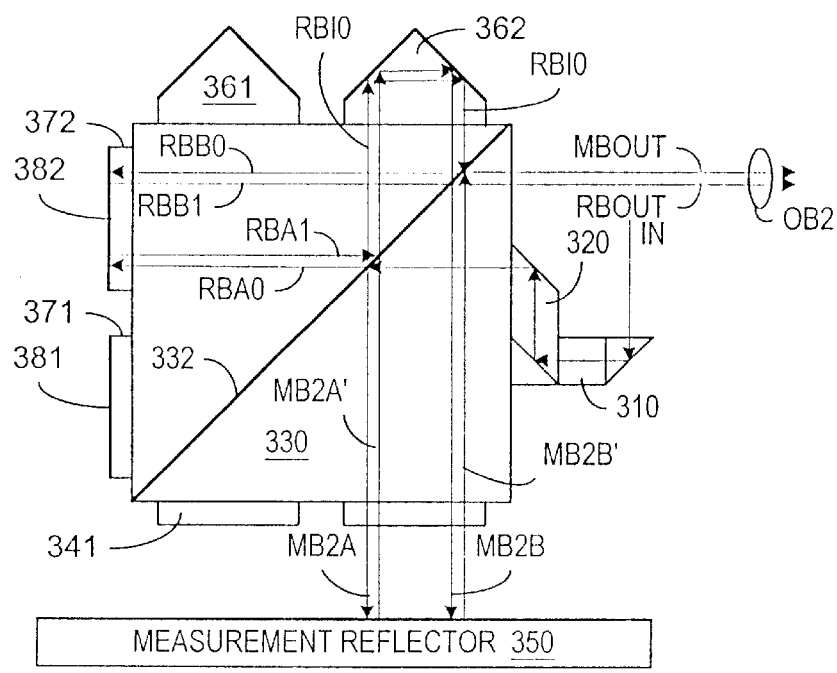

FIGS. 4A and 4B illustrate beam paths for measurement beams and reference beams associated with two measurement axes in a horizontal plane through rhomboid assembly 320. As illustrated, the input beam from rhomboid assembly 310 to rhomboid assembly 320 is incident on a beam-splitter coating between the elements of rhomboid assembly 320. FIG. 4A shows only beams resulting form light transmitted into PBS 330 through the beam-splitter coating. FIG. 4B shows beams resulting form light reflected from the beam-splitter coating and the end of rhomboid assembly 320 into PBS 330.

Light transmitted into PBS 330 in FIG. 4A is incident on a PBS coating 332 that reflects nearly 100% of the light having a first linear polarization and transmits nearly 100% of the light having a linear polarization orthogonal to the first linear polarization. Light reflected from PBS coating 332 forms an outgoing measurement beam MB1A that passes through quarter-wave plate 341 and strikes a measurement reflector 350. Quarter-wave plate 341 is attached to PBS 330 as part of the integrated beam optics structure.

Each quarter-wave plate used in interferometer 300 is a plate of a birefringent material in which beam components having polarizations along different orthogonal axes of the quarter-wave plate travel at different velocities. The thickness of the quarter-wave plate causes a 90°-phase shift between the orthogonal components of linearly polarized light of the wavelength incident on the quarter-wave plate. The linear polarization of the incident beam is at 45° to the axes of the quarter-wave plate, and traversing the quarter-wave plate changes the polarization of the beam from linear to circular. After being reflected, the circularly polarized light returns through the quarter wave plate and exits as a linearly polarized beam having a polarization orthogonal to the original linear polarization.

In FIG. 4A, measurement reflector 350 is a plane mirror that is aligned so that measurement reflector 350 reflects measurement beam MB1A directly back as beam MB1A'. (In FIGS. 4A, 4B, 4C, and 4D, beams such as beams measurement MB1A and MB1A' that overlap are shown as being separated from each other to improve the legibility of the figures.)

Measurement reflector 350 is mounted on a structure (not shown) such as a wafer stage that the interferometer measures. Movement of measurement reflector 350 causes a Doppler shift in measurement beam MB1A' so that the frequency of measurement beam MB1A' differs from the frequency of measurement beam MB1A.

Reflected measurement beam MB1A' traverses quarter-wave plate 341 and exits quarter-wave plate 341 with the polarization that PBS coating 332 transmits. Measurement beam MB1A' thus passes through PBS coating 332 and enters cube corner reflector 361 at an offset from the axis of cube corner reflector 361. Cube corner reflector 361 is a retroflector and therefore keeps a reflected measurement beam MB1B parallel to measurement beam MB1A'. The off axis entry of measurement beam MB1A' causes reflected measurement beam MB1B to be displaced from measurement beam MB1A' by about twice the offset of measurement beam MB1A' from the axis of cube corner reflector 361.

Measurement beam MB1B, which has the polarization that PBS coating 332 transmits, passes through PBS coating 332 and quarter-wave plate 341 before reaching measurement reflector 350. Quarter-wave plate 341 changes the polarization of measurement beam MB1B to circular before measurement beam MB1B is reflected from measurement reflector 350 as measurement beam MB1B'. The reflection from measurement reflector 350 causes a further Doppler shift according to the velocity of measurement reflector 350.

Measurement beam MB1B' passes through quarter-wave plate 341 and undergoes a change from circular to linear polarization. The two traversals through quarter-wave plate 341 effectively rotate the linear polarization by 90°. Accordingly, PBS coating 332 reflects measurement beam MB1B' to provide a measurement component MBOUT of an output beam OB1.

The light from input beam IN that PBS coating 332 transmits forms a reference beam RB1A. Reference beam RB1A passes from PBS 330 into a quarter-wave plate 371 and is reflected from HR coating 381, which is on a rear surface of quarter-wave plate 371 and acts as a reference reflector. The resulting reflected beam RB1A' passes back through quarter-wave plate 371 before striking PBS coating 332. The two traversals of quarter-wave plate 371 change the linear polarization by 90° causing PBS coating 332 to reflect reference beam RB1A' into cube corner reflector 361, which outputs a displaced parallel reference beam RBI1. PBS coating 332 reflects reference beam RBI1 to produce reference beam RB1B.

The reference beam RB1B reflected from PBS coating 332 traverses quarter-wave plate 371, reflects from HR coating 381 and returns as reference beam RB1B'. The 90° change in polarization resulting from twice traversing quarter-wave plate 371 causes reference beam RB1B' to pass through PBS coating 332 and exit PBS 330 as a reference component RBOUT of output beam OB1.

Output beam OB1 includes light from measurement beam MBOUT, which has one polarization and corresponds to the measurement beam MB1B', and from reference beam RBOUT, which has an orthogonal polarization and corresponds to reference beam RB1B'. Beams MBOUT and RBOUT exit the interferometer toward a lens assembly (not shown). In the lens assembly, beams MBOUT and RBOUT pass through a lens and a linear polarizer that is at 45° to each beam's linear polarization. Upon exiting the linear polarizer, the beams interfere and create a measurement signal, and conventional system electronics (not shown) compares the phase of the measurement signal to the phase of the reference signal from the laser to determine the relative displacement of measurement reflector 350 along the axis associated with measurement beam MB1A.

Interferometer 300 must be insensitive to changes in temperature to prevent temperature-induced measurement error. In accordance with an aspect of the present invention, quarter-wave plate 371 is optically contacted to PBS 330, and HR coating 381 is directly on quarter-wave plate 371. Alternatively, HR coating 381 can be replaced with any reference reflector that is optically attached to quarter-wave plate 371. The optical attachment of a reference reflector (e.g., HR coating 381) to the polarization-changing element (e.g., quarter-wave plate 371) and the polarization-changing element to PBS 330 fixes their orientation and improves the stability of the reference reflector and also eliminates the need for separated reference mirror substrate and mounting.

FIG. 4B shows the beams in interferometer 300 for a second measurement axis in the same plane as that of FIG. 4A. In FIG. 4B, rhomboid assembly 320 acts to shift the location of the input beam IN. As a result, measurement beams MB2A, MB2A', MB2B, and MB2B' and reference beams RB2A, RB2A', RB2B, and RB2B' are shifted relative to their respective counterparts, measurement beams MB1A, MB1A', MB1B, and MB1B' and reference beams RB1A, RB1A', RB1B, and RB1B'. Elements 342, 362, 372, and 382, which are substantially identical to corresponding elements 341, 361, 371, and 381 are positioned according to the shift and act on the shifted beams in the same manner as described above for the corresponding elements. Accordingly, a detailed description of that operation is not duplicated here.

As noted above, rhomboid assembly 310 provides two input beams to rhomboid assembly 320 and those input beams are vertically offset from each other. Measurement beams and output beams for the third and fourth measurement axes of interferometer 300 have identical beam paths to the first and second measurement axes but traverse elements 343, 363, 373, and 383 and elements 344, 364, 374, and 384, respectively.

Figure 4C:
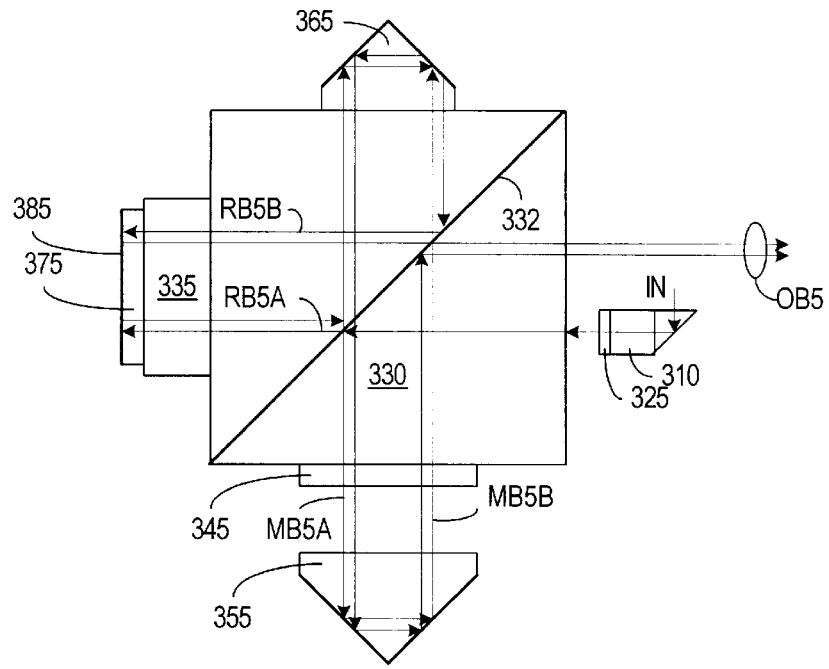

A fifth measurement axis illustrated in FIG. 4C differs from the measurement axis illustrated in FIGS. 4A and 4B in the position of the measurement axis and measurement reflector 355. In particular, the fifth measurement axis is centrally located on a side of PBS 330, and the fifth measurement axis employs a retroflector (e.g., a cube corner) as measurement reflector 355. The reflected beam from a retroflector is parallel to the incident beam even when the retroflector is not precisely aligned. Accordingly, measurement reflector 355 can be placed on a device such as a projection lens for photolithography equipment, where measurement reflector 355 may not be easily accessible for alignment.

For the fifth measurement axis, a portion of the beam input into PBS 330 via optical elements 325 reflects from PBS coating 332 and forms an outgoing measurement beam MB5A. Measurement beam MB5A traverses quarter-wave plate 345 and reflects from measurement reflector 355, which is a cube corner in the embodiment of FIG. 4C. Measurement beam MB5A is offset from the axis of cube corner 355 so that the reflected measurement beam MB5B is offset from outgoing measurement beam MB5A. Measurement beam MB5B traverses quarter-wave plate 345 and then has the polarization that PBS coating 332 transmits. Measurement beam MB5B reflects from cube corner 365, which provides a reflected beam that is collinear with measurement beam MB5A. After again passing through PBS coating 332, the outgoing measurement beam passes through quarter-wave plate 345, reflects from measurement reflector 355, returns through quarter-wave plate 345, and reflects from PBS coating 332 to form part of an output beam OB5.

The portion of the beam input that PBS coating 332 transmits forms a reference beam RB5A. Reference beam RB5A passes through an extension 335 and quarter-wave plate 375 before being reflected from HR coating 385, which is on the surface of quarter-wave plate 375. The reflected reference beam returns through quarter-wave plate 375 and extension 335 and reflects from PBS coating 332. The reference beam then reflects from cube corner 365, again reflects from PBS coating, and traverses extension 335 and quarter-wave plate 385 before reflecting from HR coating 385 a second time. The second reflection of the reference beam from HR coating 385 provides a beam that traverses quarter-wave plate 385, extension 335, and PBS coating 332 to become part of output beam OB5.

As described above, the reference beams for the fifth measurement axis traverse extension 335 four times which increases the path length of the measurement beam through glass. Extension 335 is optically attached to PBS 330 and preferably made of the same material as reference reflector 355. Alternatively, extension 335 can be part of the glass forming PBS 330. In accordance with an aspect of the invention, the size of extension 335 is such that the optical path length of the reference beams including glass of extension 335 matches the optical path length of the measurement beams including the glass of reference reflector 355.

Figure 4D:
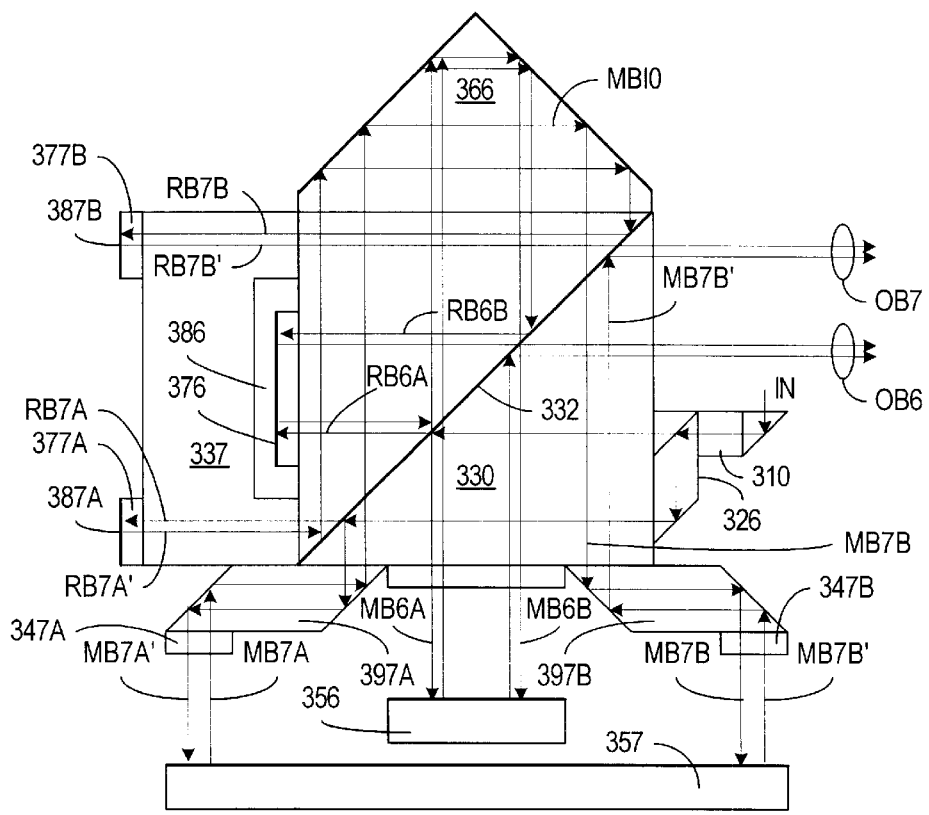

FIG. 4D shows a plane containing sixth and seventh measurement axes of interferometer 300 of FIGS. 3A and 3B. For these axes, light reflected at the first beam-splitter coating in rhomboid assembly 310 enters rhomboid assembly 326. Rhomboid assembly 326 transmits a beam for the sixth axis and shifts a beam to the appropriate entry point for the seventh measurement axis. In the embodiment of FIGS. 3A and 3B, rhomboid assemblies 326 and 320 horizontally shift the input beams from rhomboid assembly 310 in opposite directions.

The sixth measurement axis is centrally located in PBS 330 similarly to the fifth measurement axis, but the sixth measurement axis reflects from a measurement reflector 356 that is a plane mirror instead of a cube corner. Accordingly, measurement beams MB6A and MB6B do not have additional path lengths through glass of measurement reflector 356, and reference beams RB6A and RB6B do not require an extension of PBS 330. Quarter-wave plate 376 with HR coating 386 is thus directly attached to PBS 330.

The seventh measurement axis employs measurement beams MB7A and MB7B having a wider separation than the measurement beams employed for the other axes. In accordance with an aspect of the present invention, interferometer 300 uses rhomboid elements 397A and 397B to expand the distance between measurement beams MB7A and MB7B. The addition of extension 337 to PBS 330 equalizes the optical path lengths for reference beams RB7A and RB7B with the optical path lengths of measurement beams MB7A and MB7B. In contrast, prior interferometers have employed polarizing beam-splitters having dimensions large enough to accommodate the required separations between measurement beams. Use of rhomboid elements 397A and 397B and extension 337 advantageously reduces the overall size of PBS 330, which reduces the size and weight of the interferometer and reduces the difficulty in obtaining large pieces or glass with sufficient index homogeneity for a PBS.

For the seventh measurement axis, the portion of the input beam having the polarization that PBS coating 332 reflects forms measurement beam MB7A, and the portion of the input beam having the polarization that PBS coating 332 transmits forms reference beam RB7A. Measurement beam MB7A enters rhomboid element 397A, which displaces measurement beam MB7A laterally before measurement beam MB7A passes through quarter-wave plate 347A on the way to a measurement reflector 357.

Reflected measurement beam MB7A' passes through quarter-wave plate 345A, rhomboid element 397A, and PBS coating 332 to enter cube corner reflector 366. Cube corner reflector 366 is large enough to displace measurement beam MB7B to an opposite edge of PBS 330. The path of measurement beam MB7B goes through rhomboid element 397B and quarter-wave plate 347B to measurement reflector 357, and reflected beam MB7B' from measurement reflector 357 travels back through quarter-wave plate 347B and rhomboid element 397B to reflect from PBS coating 332 and form part of output beam OB7.

Reference beam RB7A traverses extension 337 before reaching quarter-wave plate 377A and reflecting from HR coating 387A. Reflected reference beam RB7A' returns through quarter-wave plate 377A and extension 337 to reflect from PBS coating 332 and enter cube corner 366 along the same path as measurement beam MB7A'. Displaced reference beam RB7B exits cube corner reflector 366, reflects from PBS coating 332, and traverses extension 337 and quarter-wave plate 377B before reflecting from HR coating 387B. Reflected reference beam RB7B' then traverses quarter-wave plate 377B, extension 337, and PBS coating 332 before measurement beam MB7B' becomes part of output beam OB7.

Extension 337 has a length selected so that the optical path lengths through extension 337 of the reference beams match the optical path lengths of the measurement beams through rhomboid elements 397A and 397B and any glass in measurement reflectors 357. Having the same optical paths avoids changes in the relative optical path lengths of the measurement and reference beams that could otherwise arise from thermal expansion and change of index with temperature of the optical elements. In alternative embodiments of the invention, extension 337 can be a separate glass element optically contacted to PBS 330 or extension 337 can be part of the same glass that forms PBS 330.

With measurement beams MB7A and MB7B for the seventh measurement axis being widely separated, measurement beams MB6A and MB6B for a sixth measurement axis can be accommodated between measurement beams MB7A and MB7B. In accordance with an aspect of the invention, the interferometer uses the same cube corner 366 for two measurement axes that are in the same horizontal plane and centered on the same line. Extension 337 has a cutout portion to accommodate the quarter-wave plate 376 for the sixth measurement axis, which is in the same plane as the seventh measurement axis. In FIG. 4D, the sixth and seventh measurement axes use plane mirrors for measurement reflectors 356 and 357. However, the use of cube corners as measurement reflectors would provide additional path length in glass for the measurement beams as described above. The cutout portion of extension 337 can be expanded to accommodate an extension between quarter-wave plate 376 and PBS 330.

Principles of the invention describe above with regard to a 7-axis interferometer can be applied to interferometers having any number of axes. For example, to add a further measurement axis to a particular horizontal plane, the horizontal rhomboid assembly 320 or 326 can be replaced with an assembly having more rhomboid elements to provide more input beams at the required locations. To have only one measurement axis in a horizontal plane, a separate rhomboid element or a rhomboid assembly with an HR coating between elements can shift the input beam horizontally to the required entry into the PBS, or an element that transmits the input beam without offset can replace rhomboid assembly 320 or 326 and direct a beam directly from rhomboid assembly 310 to PBS 330. To increase or decrease the number of horizontal planes containing one or more measurement axis, rhomboid assembly 310 can be replace with an assembly having more or fewer elements.

An interferometer having many axes such as described above can determine the relative positions and orientations of multiple objects and provide redundant measurements to improve reliability. Additionally, the compact integrated structures disclosed herein can be employed in environments where space is limited. Such features are highly desired in complicated environments such as in photolithography equipment.

Figure 5:
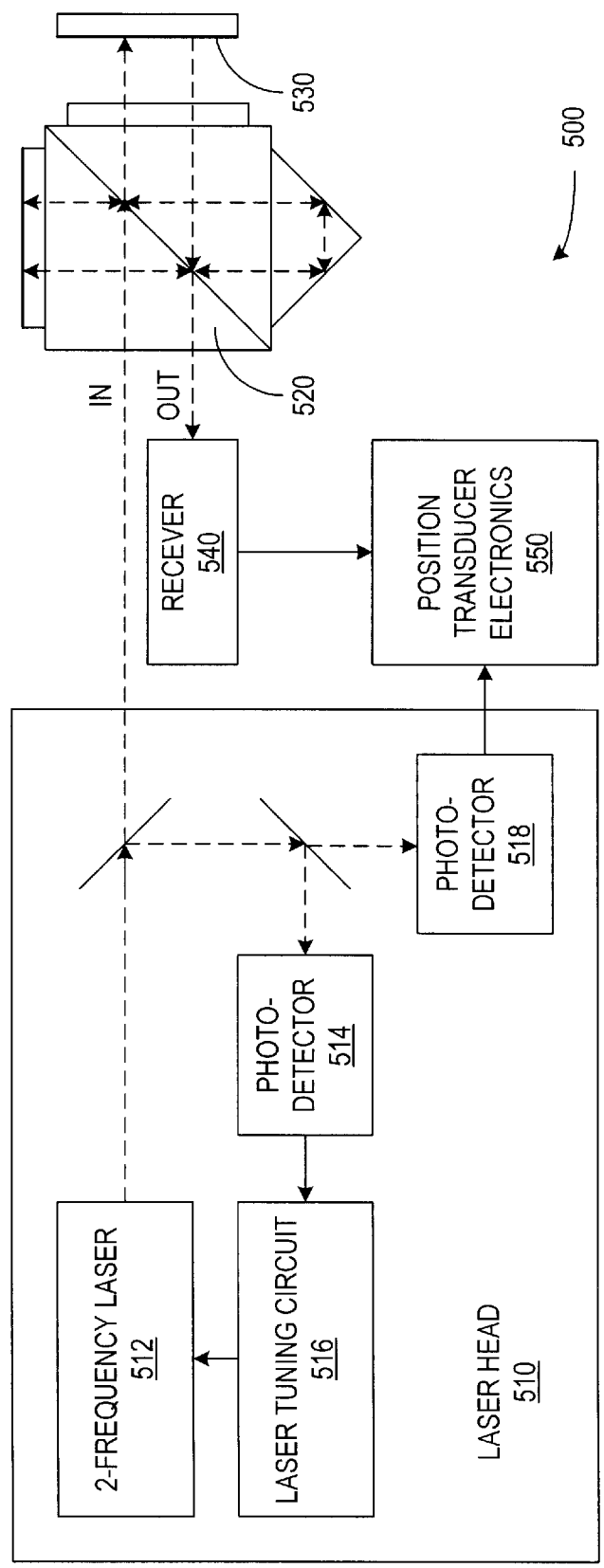
FIG. 5 is a block diagram of an interferometer system in accordance with an embodiment of the invention.

FIG. 5 is a block diagram of an exemplary interferometer system 500 that measures relative motion of a reflector 530. Interferometer system 500 includes a laser head 510 that provides an input beam IN to integrated interferometer optics 520. Integrated interferometer optics 520 can be according to the embodiments of the invention illustrated in FIGS. 3A and 3B or any other embodiment of the present invention. However, FIG. 5 shows only one of the measurement axes.

In the exemplary embodiment, laser head 510 is from the 5517 family of laser heads commercially available from Agilent Technologies, Inc. Laser head 510 includes a 2-frequency He13 Ne laser 512. Output of a laser beam composed of two frequencies f1 and f2 results from applying an axial magnetic field in laser 512. Frequencies f1 and f2 are close to each other but in beams that have opposite circular polarizations. Laser head 510 converts the circularly polarized beams into a linearly polarized beam having frequency f1 and a linearly polarized beam having frequency f2, the two beams having orthogonal linear polarizations. A photodetector 514 and laser tuning circuit 516 tune laser 512 for frequency stability. A photodetector 518 in laser head 510 receives and combines portions of the two beams to produce an electric reference signal at the beat frequency f1–f2 of the two beams.

An output beam OUT from integrated interferometer optics 520 includes portions MBOUT and RBOUT from measurement and reference beams as described above. Measurement portion MBOUT, which underwent Doppler shifts according to the relative movement of measurement mirror 530, has a frequency f1±Δf1 . Reference portion RBOUT has frequency f2.

A receiver 540, which can be an E1709 receiver available from Agilent Technologies, Inc., receives output beam OUT from integrated interferometer optics 520. Receiver 540 combines beam portions MBOUT and RBOUT to provide an electric signal having a frequency f1–f2±Δf1. Accordingly, systems measuring larger relative velocities need a large frequency difference (f1–f2) so that f1–f2±Δf1 is greater than a minimum value.

Position transducer electronics 550 processes the electric signals from photodetector 518 and receiver 540 to determine a relative motion measurement for the measurement axis associated output beam OUT. Since position transducer electronics relies on frequency or phase information to make measurements, the measurements are relatively immune to errors caused by intensity variation.

Although the invention has been described with reference to particular embodiments, the description is only an example of the invention's application and should not be taken as a limitation. In particular, although the above describes the example of integrated interferometer optics in a system employing light with two different frequencies, the integrated optics is also suitable for other types of interferometers. Various other adaptations and combinations of features of the embodiments disclosed are within the scope of the invention as defined by the following claims.

I claim:

1. A method for manufacturing a rhomboid assembly comprising:
    forming a coating on a major surface of a first plate of glass, the first plate having two major surfaces that are parallel and planar;
    gluing the first plate to a second plate of glass with the coating between the first and second plates;
    making parallel cuts through the first and second plates of glass at an acute angle relative to the major surfaces to form one or more blanks, wherein each blank has parallel surfaces corresponding to two of the cuts; and
    finishing at least one of the parallel surfaces of one or more of the blanks to make optical quality planar surfaces.

2. The method of claim 1, further comprising:
    forming a second coating on a major surface the second plate; and
    gluing the second plate to a third plate of glass with the second coating between the second and third plate, wherein
    the parallel cuts cut through the first, second, and third plates.

3. The method of claim 1, further comprising:
    cutting one of the blanks perpendicular to the parallel surfaces of the blank; and
    finishing to optical quality a surface created by cutting perpendicular to the parallel surfaces.

4. The method of claim 3, wherein cutting one of the blanks perpendicular to the parallel surfaces of the blank converts a rhomboid element in the blank to a prism.

5. The method of claim 1, wherein the coating when used in the blank has a transmittance and a reflectance that is substantially independent of the polarization of light incident on the coating.

6. The method of claim 1, wherein the acute angle is 45°.

7. The method of claim 1, further comprising attaching to an optical element to one of the parallel surfaces at a location corresponding to a beam input through the parallel surface, wherein the optical element has an antireflective coating.

8. The method of claim 7, wherein the optical element is an optical window.

9. The method of claim 7, wherein the optical element is a prism.

10. An interferometer comprising:
    a polarizing beam-splitter; and
    a first rhomboid assembly having a surface that is in contact with and attached to the polarizing beam-splitter, wherein the first rhomboid assembly is oriented to receive a first input beam and split the first input beam into a plurality of beams directed through the surface into the polarizing beam-splitter.

11. The interferometer of claim 10, further comprising a second rhomboid assembly attached to the first rhomboid assembly, wherein the second rhomboid assembly is oriented to receive a second input beam and split the second input beam into a plurality of beams, one of the beams from the second rhomboid assembly being the first input beam to the first rhomboid assembly.

12. The interferometer of claim 11, wherein
    the plurality of beams directed from the first rhomboid assembly into the polarizing beam-splitter are separated from each other along a first axis; and
    the plurality of beams from the second rhomboid assembly are separated from each other along a second axis that is perpendicular to the first axis.

13. The interferometer of claim 12, further comprising an optical element optically attached to the polarizing beam-splitter and the second rhomboid assembly, the optical element receiving one or more of the beams from the second rhomboid assembly and directing one or more beams into the polarizing beam-splitter.

14. The interferometer of claim 13, wherein the optical element comprises a rhomboid element.

15. The interferometer of claim 13, wherein the optical element comprises a third rhomboid assembly oriented to receive a third input beam from the second rhomboid assembly and split the third input beam into a plurality of beams directed into the polarizing beam-splitter.

16. The interferometer of claim 10, wherein the first rhomboid assembly is cemented to the polarizing beam-splitter.

17. The interferometer of claim 10, wherein the first rhomboid assembly is optically contacted to the polarizing beam-splitter.

18. The interferometer of claim 10, further comprising quarter-wave plate attached to the polarizing beam splitter by optical contacting.

19. An interferometer comprising:
    a polarizing beam-splitter oriented to split an input beam into a reference beam and a measurement beam for a first measurement axis of the interferometer;
    a polarization-changing element optically attached to a surface of the polarizing beam-splitter, the polarization-changing element being in a path of the reference beam; and a reference reflector optically attached to the polarization-changing element, wherein the reference reflector is a reflective coating on the polarization-changing element and is positioned to reflect the reference beam back through the polarization-changing element and back into the polarizing beam-splitter.

20. The interferometer of claim 19, further comprising a retroflector optically attached to the polarizing beam-splitter, the retroflector being positioned to receive the reference beam reflected from the reference reflector and receive the measurement beam after reflection of the measurement beam from a measurement reflector on an object being measured.

21. The interferometer of claim 19, further comprising a rhomboid element optically attached to the polarizing beam-splitter and positioned to receive the measurement beam from the polarizing beam-splitter, the rhomboid element shifting the measurement beam to a position corresponding to a measurement reflector.

22. The interferometer of claim 19, further comprising an extension to the polarizing beam-splitter, wherein the extension has a length such that an optical path length of the reference beam through the extension matches an optical path length of the measurement beam.

23. An interferometer comprising:
a polarizing beam-splitter oriented to split an input beam into a reference beam and a measurement beam for a first measurement axis of the interferometer;

a polarization-changing element optically attached to a surface of the polarizing beam-splitter, the polarization-changing element being in a path of the reference beam;

a reference reflector optically attached to the polarization-changing element, wherein the reference reflector is positioned to reflect the reference beam back through the polarization-changing element and back into the polarizing beam-splitter; and a retroflector optically attached to the polarizing beam-splitter, the retroflector being positioned to receive the reference beam reflected from the reference reflector and receive the measurement beam after reflection of the measurement beam from a measurement reflector on an object being measured, wherein the retroflector is positioned to further receive a second reference beam and a second measurement beam that are associated with a second measurement axis of the interferometer.

24. The interferometer of claim 23, further comprising a first rhomboid assembly optically attached to the polarizing beam-splitter, wherein the first rhomboid assembly is oriented to receive a first beam and split the first beam into a plurality of beams directed into the polarizing beam-splitter, the plurality of beams including the input beam.

25. An interferometer comprising:
a polarizing beam-splitter oriented to split an input beam into a reference beam and a measurement beam, wherein the measurement beam exits the polarizing beam splitter along a first path; and a first rhomboid element optically attached to the polarizing beam-splitter and positioned to receive the measurement beam from the polarizing beam-splitter, the rhomboid element shifting the measurement beam to a second path to a measurement reflector, the second path being parallel to and offset from the first path.

26. The interferometer of claim 23, further comprising an extension to the polarizing beam-splitter, wherein the extension is along a path of the reference beam to a reference reflector and has a length such that an optical path length of the reference beam through the extension matches an optical path length of the measurement beam.

27. The interferometer of claim 25, further comprising a second rhomboid element optically attached to the polarizing beam-splitter and positioned to receive the measurement beam from the polarizing beam-splitter after the measurement beam returns to the polarizing beam-splitter from the measurement mirror, the second rhomboid element shifting the measurement beam to a third path to the measurement mirror.

28. An interferometer comprising:
a polarizing beam-splitter oriented to split a first input beam into a first reference beam and a first measurement beam and split a second input beam into a second reference beam and a second measurement beam;

a rhomboid element optically attached to the polarizing beam-splitter and positioned to receive the first measurement beam from the polarizing beam-splitter, the rhomboid element shifting the first measurement beam to a position corresponding to a measurement reflector;

a first extension to the polarizing beam-splitter, wherein the first extension has a length such that an optical path length of the first reference beam through the first extension matches an optical path length of the first measurement beam; and a second extension to the polarizing beam-splitter, wherein the second extension has a length such that an optical path length of the second reference beam through the second extension matches an optical path length of the second measurement beam.

29. The interferometer of claim 28, wherein the length of the second extension is according to an optical path length of the second measurement beam through glass of a second measurement reflector.

30. An interferometer comprising:
a polarizing beam-splitter;

a first rhomboid assembly positioned to receive an input beam and split the input beam into a plurality of beams separated from each other along a first axis; and a second rhomboid assembly optically positioned to receive at least one of the plurality of beams from the first rhomboid assembly and split the received beam into a plurality of beams that are directed into the polarizing beam-splitter, wherein the plurality of beams from the second rhomboid assembly are separated from each other along a second axis that is perpendicular to the first axis.

31. The interferometer of claim 30, further comprising an optical element between the first rhomboid assembly and the polarizing beam-splitter, the optical element receiving one or more of the beams from the first rhomboid assembly and directing the one or more beams into the polarizing beam-splitter.

32. The interferometer of claim 31, wherein the optical element comprises a rhomboid element.

33. The interferometer of claim 31, wherein the optical element comprises a third rhomboid assembly oriented to receive at least one of the beams from the second rhomboid assembly and split each received beam into a plurality of beams directed into the polarizing beam-splitter.

34. An interferometer comprising:
a polarizing beam-splitter positioned to split an input beam into a measurement beam and a reference beam, wherein the measurement beam exits the polarizing beam splitter through a first face of the polarizing beam-splitter and the reference beam exits the polarizing beam splitter through a second face of the polarizing beam-splitter; and
an extension to the polarizing beam splitter, wherein the extension is at the second face of the polarizing beam splitter and in a path of the reference beam, the extension having a length that adds to an optical path length of the reference beam an amount that compensates for one or more additions to an optical path length of the measurement beam caused by one or more optical elements in a path of the measurement beam that are not in the path of the reference beam.

35. The interferometer of claim 34, wherein the one or more optical elements in the path of the measurement beam comprise a cube corner reflector that acts as a measurement reflector and returns the measurement beam to the polarizing beam-splitter.

36. The interferometer of claim 34, wherein the one or more optical elements in the path of the measurement beam comprise a rhomboid element positioned to laterally shift the path of the measurement beam.

* * * * *